(12) United States Patent
Romanik et al.

(10) Patent No.: US 7,113,063 B2
(45) Date of Patent: Sep. 26, 2006

(54) ROTATION SENSING

(75) Inventors: Carl Romanik, Fremont, CA (US);
Bruce Edwards, San Carlos, CA (US);
Sandra Loh, Mountain View, CA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 0 days.

(21) Appl. No.: 10/936,102

(22) Filed: Sep. 7, 2004

(65) Prior Publication Data
US 2005/0068133 A1    Mar. 31, 2005

Related U.S. Application Data

(63) Continuation of application No. 10/101,198, filed on Mar. 18, 2002, now abandoned.

(51) Int. Cl.
*H01H 9/00*    (2006.01)
(52) U.S. Cl. .................................. 335/205; 335/206
(58) Field of Classification Search ........ 335/151–154, 335/205–207
See application file for complete search history.

(56) References Cited

U.S. PATENT DOCUMENTS

| 3,651,438 | A | * | 3/1972 | Hayashi et al. ............. 335/207 |
| 3,713,056 | A | * | 1/1973 | Hosokawa ................... 335/206 |
| 4,199,741 | A | * | 4/1980 | Serrus Paulet .............. 335/206 |
| 4,308,665 | A | * | 1/1982 | Losch .......................... 33/781 |
| 4,389,627 | A | * | 6/1983 | Uesugi et al. ............... 335/206 |
| 4,395,695 | A | * | 7/1983 | Nakamura ................ 338/32 H |
| 4,868,530 | A | * | 9/1989 | Ahs ............................ 335/207 |
| 5,608,278 | A | * | 3/1997 | Mey et al. ..................... 310/90 |
| 5,629,659 | A | * | 5/1997 | Steiner ........................ 335/205 |
| 5,646,601 | A | * | 7/1997 | Wallace et al. ........... 340/686.1 |
| 5,723,789 | A | * | 3/1998 | Shannon ................... 73/514.31 |
| 6,333,626 | B1 | * | 12/2001 | Edwards ...................... 324/110 |
| 2003/0094945 | A1 | * | 5/2003 | Netzer ......................... 324/260 |

\* cited by examiner

*Primary Examiner*—Elvin Enad
*Assistant Examiner*—Bernard Rojas
(74) *Attorney, Agent, or Firm*—Kilpatrick Stockton LLP

(57) ABSTRACT

Methods and apparatus implementing and using techniques for sensing rotations of a rotating device, including using at least one switch located in a first plane and a magnet rotating in a plane substantially parallel to the first plane about a rotation axis, the magnet having a north-south axis tilted at an oblique angle to the first plane. The magnet causes the at least one switch to open and close as the magnet rotates about the rotation axis.

37 Claims, 3 Drawing Sheets

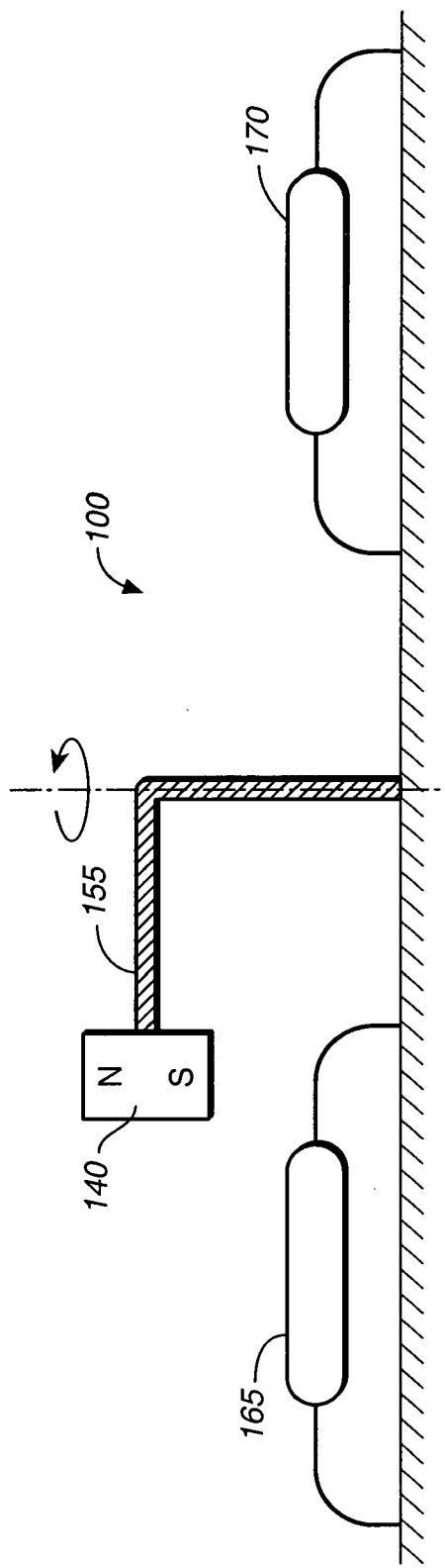
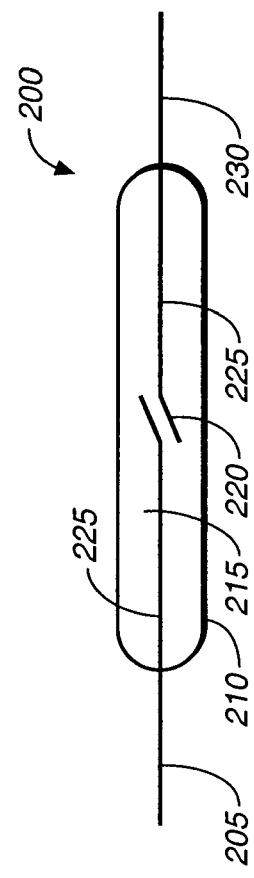
FIG._1
FIG._2

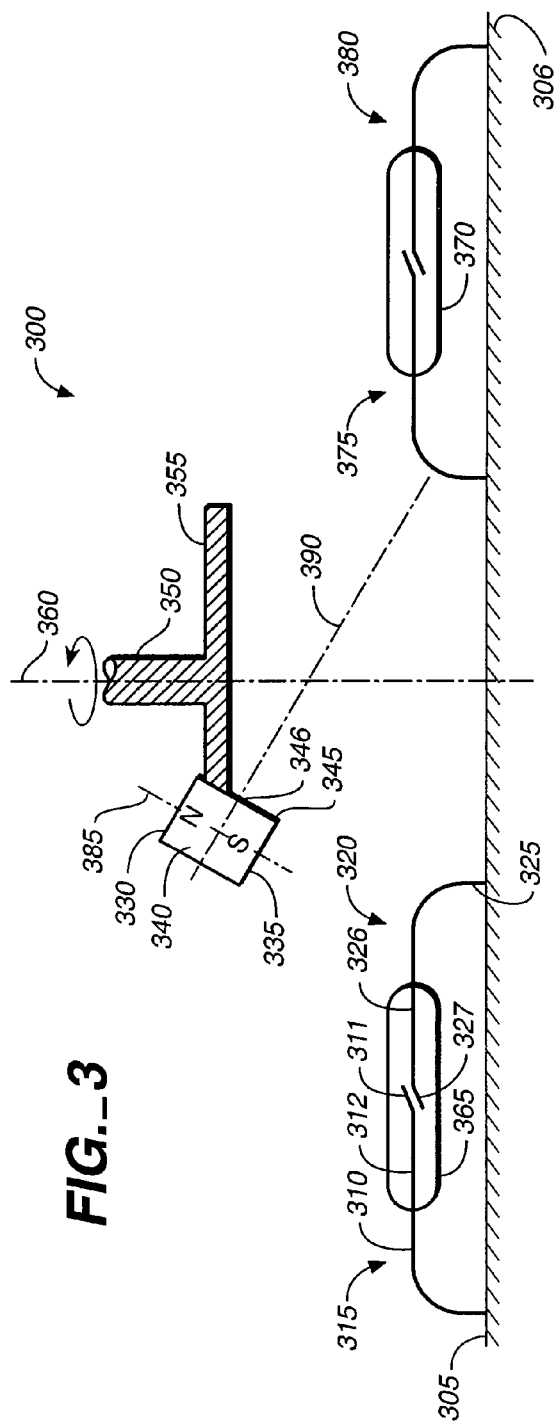
FIG._3
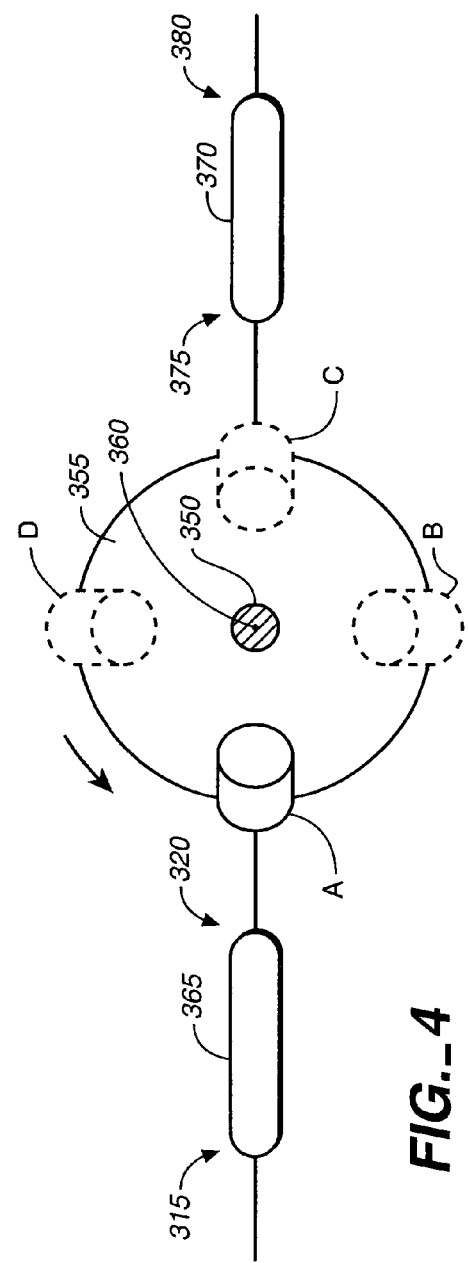
FIG._4

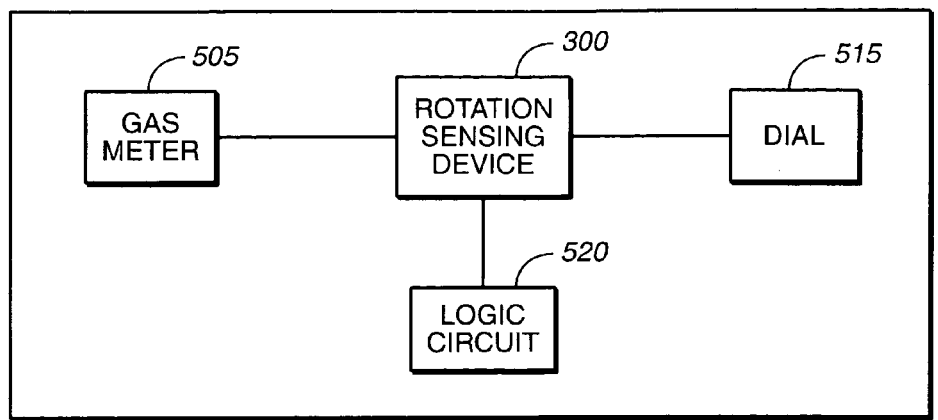
FIG._5
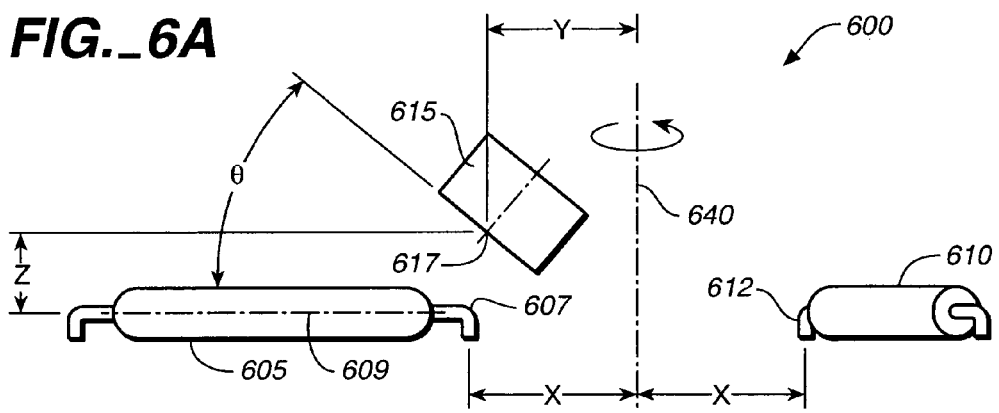
FIG._6A
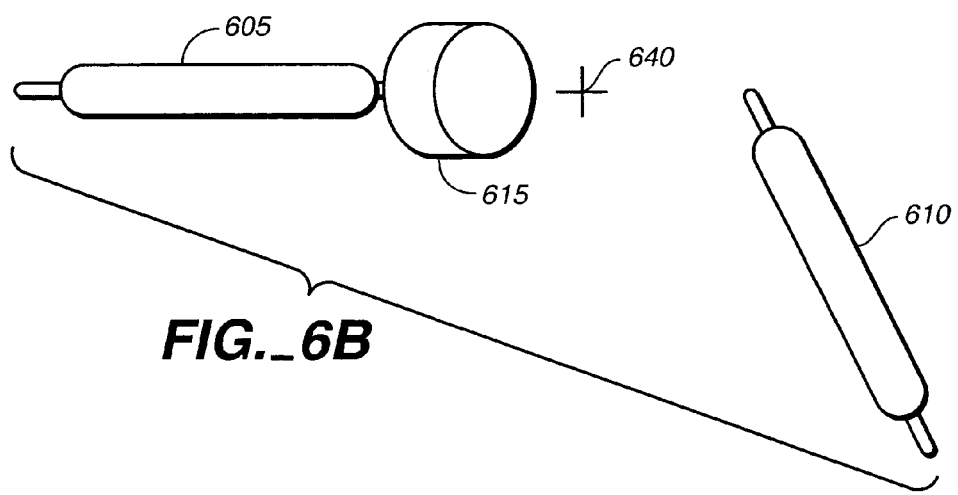
FIG._6B

ROTATION SENSING

CROSS-REFERENCE TO RELATED APPLICATIONS

The present application is a continuation of application Ser. No. 10/101,198 filed Mar. 8, 2002, now abandoned.

TECHNICAL FIELD

This invention relates to rotation sensing using a magnetic reed switch.

BACKGROUND

By moving a magnet close to and then away from a magnetically activated switch, the switch can be toggled between opened and closed positions. The distances between the magnet and the magnetically activated switch required to open and close the switch are a function of the strength of the magnet and the sensitivity of the switch.

A magnetically activated switch can be used in a sensing environment. One application is a gas metering device that uses a magnetic reed switch to sense the rotations of a rotating device within a gas meter. For example, as shown in FIG. 1, to sense the rotations of a rotating device, a magnet 140 could be fixed onto the rotating device (not shown) or the magnet 140 could be fixed to a disk 155 in direct or indirect contact with, and therefore rotating at the same rotational velocity as, the rotating device within the gas meter. The magnet 140 and magnetic reed switch or switches 165, 170 can be positioned so that the magnet 140 rotates close enough to the magnetic reed switches 165, 170 to toggle a switch closed and then opened as the magnet 140 rotates over and then away from the switch. A logic circuit activated by the opening and closing of the switches can be used to increment a counter for each rotation sensed by a switch.

A rotation sensing device as described above can be restrained in size, depending on the application. If the size is restrained, the strength of the magnet and the sensitivity of the switch or switches must be carefully selected, or else a switch may remain in the closed position when the magnet has rotated away from the switch or the switch may fail to close when the magnet passes through the activation position.

SUMMARY

The present invention provides methods and apparatus for sensing rotations of a rotating device. In general, in one aspect, the invention features a rotation sensing device including at least one switch located in a first plane and a magnet rotating in a plane substantially parallel to the first plane about a rotation axis. The magnet has a north-south axis tilted at an oblique angle to the first plane. As the magnet rotates about the rotation axis, the magnet causes the at least one switch to open and close.

Implementations of the invention may include one or more of the following. A first end of the at least one switch can be subjected to a maximum intensity of a magnetic field emitted from the magnet when the magnet is closest to the first end of the switch, and subjected to a minimum intensity of the magnetic field when the magnet is furthest from the switch, as the magnet rotates about the rotation axis. A pole of the magnet can be directed toward the first end of the at least one switch when the magnet is in a position closest to the first end. A side of the magnet can be directed toward the first end when the magnet is in a position other than the position closest to the first end. The magnet, having a first pole and a second pole aligned with the north-south axis and the first pole closer to the first plane then the second pole, can be tilted such that the first pole is tilted away from the rotation axis and the second pole is tilted toward the rotation axis. The north-south axis can be tilted at an approximately 50 degree angle to the first plane. The at least one switch can be a magnetic reed switch, Hall-effect switch or Weigand wire switch.

In general, in another aspect, the invention features a rotation sensing device including at least one magnetic reed switch located in a first plane and a magnet rotating in a plane substantially parallel to the first plane about a rotation axis. The magnet has a north-south axis tilted at an oblique angle to the first plane. As the magnet rotates about the rotation axis, the magnet causes the at least one magnetic reed switch to open and close.

Implementations of the invention can include one or more of the following. The at least one magnetic reed switch has a first end and a second end, the first end closest to the rotation axis of the magnet. The magnet can pass near enough to the first end of the at least one magnetic reed switch during a rotation of the magnet for a magnetic field emitted by the magnet to close the switch. The first end of the at least one magnetic reed switch can be subjected to a maximum intensity of the magnetic field emitted from the magnet when the magnet is closest to the first end of the switch, and subjected to a minimum intensity of the magnetic field when the magnet is furthest from the switch, as the magnet rotates about the rotation axis. A pole of the magnet can be directed toward the first end of the at least one magnetic reed switch when the magnet is in a position closest to the first end, and a side of the magnet can be directed toward the first end of the at least one magnetic reed switch when the magnet is in a position other than the position closest to the first end. The magnet, having a first pole and a second pole aligned with the north-south axis and the first pole is closer to the first plane then the second pole, can be tilted such that the first pole is tilted away from the rotation axis and the second pole is tilted toward the rotation axis. The north-south axis can be tilted at an approximately 50 degree angle to the first plane.

The at least one magnetic reed switch can be mounted on a printed circuit board, and the device can further include a logic circuit connected to the printed circuit board. The logic circuit is configured to sense each time the at least one magnetic reed switch is closed by the magnet, to count the number of rotations of the magnet about the rotation axis. The device can also include a support member axially aligned with the rotation axis, the support member including a radial member supporting the magnet and rotating about the rotation axis. The radial member can include an arm extending from the support member, with the magnet mounted on a distal end of the arm. Alternatively, the radial member can be a disk having a peripheral edge, with the magnet mounted on the peripheral edge of the disk.

In general, in another aspect, the invention features a rotating sensing device including a first magnetically activated switch and a second magnetically activated switch located in a first plane, and a magnet rotating in a plane substantially parallel to the first plane about a rotation axis. The magnet has a north-south axis tilted at an oblique angle to the first plane, and causes the first and second magnetically activated switches to open and close as the magnet rotates about the rotation axis.

Implementations of the invention can include one or more of the following. The first and second magnetically activated switches each have a first end and a second end. The first ends can be closest to the rotation axis of the magnet at approximately equal distances from the rotation axis. The magnet can pass near enough to the first ends of the first and second magnetically activated switches during a rotation of the magnet about the rotation axis for a magnetic field emitted by the magnet to close the first and second magnetically activated switches. The second magnetically activated switch can be aligned with and positioned opposite to the first magnetically activated switch, or can be positioned at an oblique angle to the first magnetically activated switch.

The first and second magnetically activated switches can be mounted on a printed circuit board, and the device can further include a logic circuit connected to the printed circuit board. The logic circuit is configured to sense each time the first and second magnetically activated switches are closed by the magnet to count the number of rotations of the magnet about the rotation axis. The first ends of each of the first and second magnetically activated switches can be approximately equal distances from a center point, and the device can further include a support member, perpendicular to the printed circuit board and axially aligned with the center point, supporting a radial member having the magnet fixed on an edge of the radial member. The first and second magnetically activated switches can be magnetic reed switches, Hall-effect switches or Weigand wire switches.

In general, in another aspect, the invention features a rotation sensing device including at least one switch located in a first plane, and a magnet rotating in a plane substantially perpendicular to the first plane about a rotation axis. The magnet has a north-south axis tilted at an oblique angle to the first plane and causes the at least one switch to open and close as the magnet rotates about the rotation axis. Implementations of the invention can include one or more of the following. A first end of the at least one switch can be subjected to a maximum intensity of a magnetic field emitted from the magnet when the magnet is closest to the first end of the switch, and subjected to a minimum intensity of the magnetic field when the magnet is furthest from the switch as the magnet rotates about the rotation axis. A pole of the magnet can be directed toward the first end of the at least one switch when the magnet is in a position closest to the first end, and a side of the magnet can be directed toward the first end of the at least one switch when the magnet is in a position other than the position closest to the first end.

In general, in another aspect, the invention features a method for opening and closing a magnetically activated switch located in a first plane. The method includes rotating a magnet in a second plane substantially parallel to the first plane. The magnet has a north-south axis tilted at an oblique angle to the first plane, such that when the magnet rotates to a position closest to the switch, a pole of the magnet is directed toward the switch causing the switch to close. When the magnet rotates away from the position closest to the switch, neither pole of the magnet is directed toward the switch causing the switch to open. The switch can be a magnetic reed switch, a Hall-effect switch or a Weigand wire switch. The magnet can be tilted at an angle to the first plane of approximately 50 degrees.

In general, in another aspect, the invention features a method for sensing rotations of a rotating device. The method includes rotating a magnet in a first plane substantially parallel to a second plane containing at least one magnetic reed switch, the magnet rotating at a proportional speed to the rotating device and having a north-south axis tilted at an oblique angle to the second plane. The magnet causes the switch to open and close as the magnet rotates. The at least one switch is electrically connected to a logic circuit and the logic circuit is configured to sense the rotations of the rotating device based on the openings and closings of the at least one switch.

Embodiments may have one or more of the following advantages. Tilting the north-south axis of the magnet prevents a switch from being closed by the magnetic field of the magnet when the magnet is not in the activation position. Because a switch will not be activated when the magnet is not in the activation position, more sensitive switches can be used. Broadening the range of acceptable sensitivities reduces production costs because larger tolerances are acceptable. The size of a rotation sensing device can be reduced, because the radius of rotation can be made smaller, since the distance the magnet must move away from the switch to move out of the activation zone is decreased by tilting the magnet. The difficulty of controlling the relationship between the strength of the magnet and the sensitivity of the switch is lessened, since activation of the switch is less a function of the strength of the magnet and more a function of the position of the magnet in relation to the switch during a rotation cycle.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a schematic representation of a rotation sensing device using two magnetic reed switches.

FIG. 2 is a schematic representation of a magnetic reed switch.

FIG. 3 is a schematic representation of a rotation sensing device using two magnetic reed switches and a tilted magnet.

FIG. 4 is a schematic plan view of the rotation sensing device of FIG. 3.

FIG. 5 is a schematic representation of a block diagram of a gas meter including a rotation sensing device.

FIG. 6A is a schematic representation of a rotation sensing device using two magnetic reed switches arranged at an oblique angle.

FIG. 6B is a schematic plan view of the rotation sensing device of FIG. 6A.

Like reference symbols in the various drawings indicate like elements.

DETAILED DESCRIPTION

A rotation sensing device can include a rotating magnet and at least one magnetically activated switch. Although a rotation sensing device can function with a single magnetically activated switch, a dual switch device can be more energy efficient.

A magnetic reed switch is an example of a magnetically activated switch that can be used in a rotation sensing device. Referring to FIG. 2, a single pole single throw magnetic reed switch 200 includes a glass body 210 containing an inert gas 215, for example, nitrogen, or a vacuum. Ferromagnetic blades 225 inside the glass body 210 have a gap between them at a contact area 220 when the switch is open, and contact each other at the contact area 220 when the switch is closed. The ferromagnetic blades 225 can be formed of a metal exhibiting high magnetic permeability, for example, an iron and nickel alloy. The contact area 220 on both blades is plated or sputtered with a very hard metal, for example rhodium or ruthenium. Leads 205, 230 protrude from each end of the glass body 210 and can be used to mount the magnetic reed switch 200, for example, to a printed circuit board.

Referring to FIG. 3, a rotation sensing device 300 is shown including a first magnetic reed switch 365, a second magnetic reed switch 370 and a magnet 340. The magnet 340 rotates about an axis 360 perpendicular to a plane 305 in which the magnetic reed switches 365, 370 are situated. The magnetic reed switches 365, 370 are positioned so that a first end 320, 375 of each switch is closer to the rotation axis 360 then a second end 315, 380, and so that the magnet 340 passes over the first end 320, 375 of each switch once during each rotation of the magnet 340. The magnet 340 is supported by a support member 350 that rotates about the rotation axis 360. The support member 350 can be, for example, a rotating shaft having a circular disk 355 on a distal end, and the magnet 340 can be affixed to an edge of the disk 355. Any number of other configurations can also be used, for example, the magnet 340 could be affixed to a radial arm attached to the support member 350.

The magnet 340 has a north (N) pole 330 and a south (S) pole 335, and the magnet 340 is orientated so that its north-south axis 385 is tilted at an oblique angle in relation to the plane 305. The magnet 340 can be tilted so that a pole 335 closest to the plane 305 is further away from the rotation axis 360 than the pole 330 furthest from the plane 305.

Referring to FIG. 4, the magnet 340 is orientated so that when the magnet 340 passes through position A, the magnetic field that the first magnetic reed switch 365 is subjected to is maximized, and is of sufficient intensity to close the switch 365, while the magnetic field the second magnetic reed switch 370 is subjected to is minimized so that the switch 370 remains open. Conversely, when the magnet 340 is in position C, the magnetic field the second magnetic reed switch 370 is subjected to is maximized and of sufficient intensity so that the switch 370 closes, while the magnetic field the first magnetic reed switch 365 is subjected to is minimized so that the switch 365 remains open. Position A is the activation position for the first magnetic reed switch 365, and Position C is the activation position for the second magnetic reed switch 370. When the magnet 340 is in positions B or D, the orientation of the magnet 340 is such that both the first and second magnetic reed switches 365, 370 are subjected to a weak part of the magnetic field emitted by the magnet 340, so that neither switch is activated into the closed position. At position B, the magnet 340 has moved far enough away from the first magnetic reed switch 365 so that the switch opens, but it is not yet near enough to the second magnetic reed switch 370 to close that switch.

As shown in FIG. 3, the tilt of the magnet 340 along the magnet's north-south axis 385 ensures that the first and second magnetic reed switches will behave as described above, as the magnet 340 rotates about the rotation axis 360. The magnetic field of the magnet 340 is the strongest at the magnet's two poles 330, 335 and loses intensity as the middle of a side 345 of the magnet 340 is approached. The polarity of a magnetic field is essentially neutral at the midpoint 346 of a side of a magnet. The tilt of the magnet 340 is determined in relation to the configuration of the elements of the rotation sensing device 300, including the size and strength of the magnet 340, the sensitivity of the switches 365, 370, the distance between the magnet 340 and the first ends of the switches 320, 375.

Referring to FIGS. 3 and 4, in position A, the first magnetic reed switch 365 is subjected to the maximum magnetic field intensity felt by the switch 365 during a rotation cycle, because the magnet 340 is at the closest distance to the switch 365 and a polarized end of the magnet 340, for example, the south pole 335, is directly facing the first end 320 of the switch 365. The second magnetic reed switch 370 is subjected to the minimum magnetic field intensity of the rotation cycle when the magnet 340 is in position A, because a side 345 of the magnet 340, rather than a pole, is directly facing the first end 375 of the switch 370 and the magnet 340 is at the farthest distance away from the switch 370.

When the magnet 340 is in positions B or D, neither pole 330, 335 of the magnet 340 is directly facing toward either one of the magnetic reed switches 365, 370, because the magnet is tilted along the north-south axis 385 at an oblique angle to the plane 305 in which the switches 365, 370 are situated. Because of the magnet's 340 tilted orientation, a side of the magnet 340 is directed toward the switches 365, 370, and the first ends 320, 375 of the switches 365, 370 are subjected to a weak part of the magnetic field, so that neither switch 365, 370 is activated into the closed position. If the magnet 340 was not tilted, i.e. was aligned so that the north-south axis 385 was parallel to the rotation axis, then when the magnet was in positions B or D, a pole would be directly facing toward, and substantially parallel to, the plane 305 of the switches 365, 370. In such an orientation, the likelihood of the magnet field emitted by the magnet 340 activating either or both of the switches would be considerably higher than in an orientation whereby the magnet 340 is tilted along the north-south axis 385, because the intensity of the magnetic field felt by each switch 365, 370 would be greater. In a configuration where the north-south axis 385 is parallel to the rotation axis 360, to avoid the magnet 340 activating the switches 365, 370 in positions B and D, the sensitivity of the switches 365, 370 and the strength of the magnet 340 must be tightly controlled, particularly if it is desired to minimize the footprint of the device 300.

Accordingly, by tilting the magnet 340 along the north-south axis 385 and thereby minimizing the magnetic field the switches 365, 370 are subjected to in the non-active positions (for example, positions B and D), the tolerances acceptable for the switch sensitivity can be increased, resulting in a corresponding decrease in production cost. Additionally, because the distance the magnet 340 must move away from the switches 365, 370 in order to open the switches decreases, the radius of rotation of the magnet 340 and thus overall size of the device 300 can be reduced.

The rotation sensing device 300 includes two magnetic reed switches 365, 370 orientated end to end at equal distances from the rotation axis 360. The device 300 could operate with a single magnetic reed switch or more than two magnetic reed switches. If the device 300 includes more than one magnetic reed switch, the switches do not have to arranged end to end as shown in FIG. 3, but could be arranged at oblique angles to one another, as discussed below. Although the magnetically activated switches included in the rotation sensing device 300 are magnetic reed switches, other types of switches can be used, for example, a Hall-effect switch or a Wiegand wire sensor.

Optimally, the first end 375 of the second magnetic reed switch 370 is positioned approximately 180 degrees along a circle subscribed by the rotation of the magnet 340 from the first end 325 of the first magnetic reed switch 365, as illustrated in FIG. 4. Although the magnetic reed switches 365, 370 shown in FIG. 3 are positioned radially in relation to the rotation axis 360, the switches can be orientated in any other manner, so long as the first end of each switch is an approximately equal distance from the rotation axis. In the configuration shown in FIG. 3, the magnet 340 rotates over only the first end 325, 375 of each switch 365, 370, resulting in a single closure of each switch per rotation of the magnet 340. However, the switches 365, 370 can be positioned such that a single rotation of the magnet 340 will result in multiple closures of each switch. The magnet 340 can be any magnet having a single north and south pole, for example, an electromagnet, ceramic magnet, alnico magnet, or rare earth magnet.

Optimally, each magnetic reed switch 365, 370 is positioned so that the first end 320, 375 is located at the weakest point of the magnetic field emitted by the magnet 340 when the magnet 340 is at its farthest distance from the switch 365, 370, i.e. position A with respect to the second magnetic reed switch 370 and position C with respect to the first magnetic reed switch 365. This position can be determined by experimentation, for example, by placing a magnetic field detector at the switch location and repositioning the detector until the weakest magnetic field is detected. Alternatively, if a sufficient model of the magnet is known, the optimal position can be determined using geometry and the physical parameters of the rotation sensing device. Referring to magnetic reed switch 370 as an example, typically, if the magnet 340 is positioned so when it is at the farthest distance from the switch 370 a plane bisecting the middle of the magnet 340 will intersect with the first end 375 of the switch 370 (illustrated by the dashed line 390 in FIG. 3), then the magnetic field felt by the switch 370 when the magnet is at its farthest distance will be the minimum magnetic field the switch 370 is subjected to during a rotation cycle.

The rotation sensing device 300 can be used in implementations requiring a number of rotations to be counted. In one implementation, a rotation sensing device can be used in a gas metering device. A simplified block diagram showing some components of a gas metering device 500 is shown in FIG. 5. A gas meter 505 is configured so that the volume of gas passing through a metering valve is proportional to the number of rotations of a rotating device within the gas meter 505. The gas metering device 500 includes a rotation sensing device 300. The rotation sensing device 300 can be configured as shown in FIG. 3, although other configurations, such a single magnetic reed switch device can also be used. The rotating device of the gas meter 505 is in direct or indirect contact with the support member 350 of the rotation sensing device 300 so that the support member 350 rotates the same number of times, or a proportionate number of times, as the rotating device in the gas meter 505.

When the magnet 340 moves into the activation position for the first magnetic reed switch 365, the magnetic field emitted by the magnet 340 polarizes the lead 325. For example, if the pole of the magnet 340 directed toward the first end 320 is a south pole, then a magnetic field is induced in the first lead 325, with the lead 325 having a north polarity and the contact end 327 of the blade 326 having a south polarity. The magnetic field of the first lead 325 induces a magnetic field in the second lead 310, with the contact end 311 of the blade 312 having a north polarity and the lead 310 having a south polarity. The magnetic force between the contact ends 327, 312 is strong enough to overcome a spring force of the blades 311, 326 and the ends 327, 312 contact. When contact is achieved, the switch 365 is closed and a current can flow through the switch 365. To conserve energy used by the rotation sensing device 300, as soon as the switch 365 is closed, the switch 365 can be automatically de-energized so that current stops flowing through the switch 365 while the switch 365 is closed, and the second magnetic reed switch 370 can be automatically energized. Because the second magnetic reed switch 370 is opened, no current flows through the second switch 370, and thus no excess energy is consumed.

As the magnet 340 moves into position B, the magnetic field that both the first and second magnetic reed switches 365, 370 are subjected to is minimized and the intensity is weakened so that switch 365 opens and switch 379 remains open. When the magnet 340 moves into position C, the second magnetic reed switch 370 behaves as the first magnetic reed switch 365 behaved when the magnet 340 was in position A, operating in the same manner as was described above in reference to the first magnetic reed switch 365. The second magnetic reed switch 370 closes and current momentarily flows through the switch 370 until the switch is automatically de-energized and the first magnetic reed switch 365 (which is open) is energized. By de-energizing each switch automatically once the switch has been closed, the current flowing through the switches 365, 370 can be minimized, thereby increasing the energy efficiency of the rotation sensing device 300.

The rotation sensing device 300 can be mounted on a printed circuit board 306 and electrically connected to a logic circuit 520. The logic circuit 520 is configured to count the number of rotations of the magnet 340 based on the number of openings and closings of the switches 365, 370. In one implementation, the logic circuit 520 periodically transmits a signal through a radio transmitter to a remote receiver connected to a computer. The computer is configured to interpret the signal to determine the flow of gas through the gas metering device 500.

The rotation sensing device 300 can also be in communication with a dial 515 included in the gas metering device to rotate the dial 515 in parallel with the rotation of the magnet 340. The dial 515 can be used to manually read the gas metering device 500 to determine the volume of gas flowing through the device 500.

In another embodiment, a rotation sensing device can be configured as shown in FIG. 6A-6B. The rotation sensing device 600 can include a first magnetic reed switch 605 positioned at an oblique angle to a second magnetic reed switch 610. The first ends 607, 612 of the switches 605, 610 are an equal distance X from a rotation axis 640. A magnet 615 is tilted along the north-south axis at an angle 90°-θ. The magnet 615 is positioned so that when the magnet 615 is in the activation position with respect to a switch, for example, the first magnetic reed switch 605, a mid-point of the pole 617 facing the first end 607 of the switch 605 is a distance Z above a central longitudinal axis 609 of the switch 605 and is a distance Y from the rotation axis 640. In one implementation the angle θ is approximately 40°, and the distances X, Y and Z are approximately 0.294, 0.322 and 0.158 inches respectively.

A number of embodiments of the invention have been described. Nevertheless, it will be understood that various modifications may be made without departing from the spirit and scope of the invention. For example, the magnetic reed switches can be positioned perpendicular to the plane of rotation of the magnet, i.e. parallel to the rotation axis of the magnet. Accordingly, other embodiments are within the scope of the following claims.

What is claimed is:

1. A rotation sensing device comprising:
   at least one switch located in a first plane; and
   a magnet rotating in a plane substantially parallel to the first plane about a rotation axis, wherein the magnet has a north-south axis tilted at an oblique angle to the first plane and wherein the magnet has a neutral portion intermediate north and south poles thereof, such that when the magnet is proximate the at least one switch, the north-south axis of the magnet points toward the at least one switch and such that when the magnet is distal the at least one switch, the neutral portion of the magnet is directed toward the at least one switch, and wherein the magnet causes the at least one switch to open and closes as the magnet rotates about the rotation axis.

2. The rotation sensing device of claim 1, wherein:
   a first end of the at least one switch is subjected to a maximum intensity of a magnetic field emitted from the magnet when the magnet is closest to the end of the switch; and
   the first end of the at least one switch is subjected to a minimum intensity of the magnetic field when the magnet is furthest from the switch as the magnet rotates about the rotation axis.

3. The rotation sensing device of claim 1, wherein:
   a pole of the magnet is directed toward the first end of the at least one switch when the magnet is in a position closest to the first end; and
   a side of the magnet is directed toward the first end of the at least one switch when the magnet is in a position other than the position closest to the first end.

4. The rotation sensing device of claim 1, wherein:
   the magnet has a first pole and a second pole aligned with the north-south axis;
   the first pole is closer to the first plane than the second pole; and
   the magnet is tilted such that the first pole is tilted away from the rotation axis and the second pole is tilted toward the rotation axis.

5. The rotation sensing device of claim 1, wherein the north-south axis is tilted at an approximately 50 degree angle to the first plane.

6. The rotation sensing device of claim 1, wherein the at least one switch is a magnetic reed switch.

7. The rotation sensing device of claim 1, wherein the at least one switch is a Hall-effect switch.

8. The rotation sensing device of claim 1, wherein the at least one switch is a Weigand wire switch.

9. A rotation sensing device comprising:
   at least one magnetic reed switch located in a first plane; and
   a magnet rotating in a plane substantially parallel to the first plane about a rotation axis, wherein the magnet has a north-south axis tilted at an oblique angle to the first plane and wherein the magnet has a neutral portion intermediate north and south poles thereof, such that when the magnet is proximate the at least one switch, the north-south axis of the magnet points toward the at least one switch and such that when the magnet is distal the at least one switch, the neutral portion of the magnet is directed toward the at least one switch, and wherein the magnet causes the at least one magnetic reed switch to open and close as the magnet rotates about the rotation axis.

10. The rotation sensing device of claim 9, wherein:
    the at least one magnetic reed switch has a first end and a second end, the first end closest to the rotation axis of the magnet; and
    the magnet passes near enough to the first end of the at least one magnetic reed switch during rotation of the magnet for a magnetic field emitted by the magnet to close the at least one magnetic reed switch.

11. The rotation sensing device of claim 10, wherein:
    the first end of the at least one magnetic reed switch is subjected to a maximum intensity of the magnetic field emitted from the magnet when the magnet is closest to the first end of the magnetic reed switch; and
    the first end of the at least one magnetic reed switch is subjected to a minimum intensity of the magnetic field when the magnet is furthest from the magnetic reed switch as the magnet rotates about the rotation axis.

12. The rotation sensing device of claim 10, wherein:
    a pole of the magnet is directed toward the first end of the at least one magnetic reed switch when the magnet is in a position closest to the first end; and
    a side of the magnet is directed toward the first end of the at least one magnetic reed switch when the magnet is in a position other than the position closest to the first end.

13. The rotation sensing device of claim 9, wherein:
    the magnet has a first pole and a second pole aligned with the north-south axis;
    the first pole is closer to the first plane than the second pole; and
    the magnet is tilted such that the first pole is tilted away from the rotation axis and the second pole is tilted toward the rotation axis.

14. The rotation sensing device of claim 9, wherein the at least one magnetic reed switch is mounted on a printed circuit board, the device further comprising:
    a logic circuit connected to the printed circuit board, the logic circuit configured to sense each time the at least one magnetic reed switch is closed by the magnet to count the number of rotations of the magnet about the rotation axis.

15. The rotation sensing device of claim 9, further comprising:
    a support member axially aligned with the rotation axis, the support member including a radial member supporting the magnet and rotation about the rotation axis.

16. The rotation sensing device of claim 15, wherein the radial member comprises an arm extending from the support member and wherein the magnet is mounted on a distal end of the arm.

17. The rotation sensing device of claim 15, wherein the radial member is a disk having a peripheral edge and wherein the magnet is mounted on the peripheral edge of the disk.

18. The rotation sensing device of claim 9, wherein the north-south axis is tilted at an approximately 50 degree angle to the first plane.

19. A rotation sensing device comprising:
    a first magnetically activated switch and a second magnetically activated switch located in a first plane; and
    a magnet rotating in a plane substantially parallel to the first plane about a rotation axis, wherein the magnet has a north-south axis tilted at an oblique angle to the first plane and wherein the magnet has a neutral portion intermediate north and south poles thereof, such that when the magnet is proximate the first and second switches, the north-south axis of the magnet points toward the proximate switch and the neutral portion of the magnet points toward the distal switch, and wherein the magnet causes the first and second magnetically activated switches to open and close as the magnet rotates about the rotation axis.

20. The rotation sensing device of claim 19, wherein:
the first and second magnetically activated switches each have a first end and a second end, the first ends closest to the rotation axis of the magnet; and
the first end of the first and second magnetically activated switches are approximately equidistant from the rotation axis.

21. The rotation sensing device of claim 19, wherein:
the magnet passes near enough to the first ends of the first and second magnetically activated switches during rotation of the magnet about the rotation axis for a magnetic field emitted by the magnet to close the first and second magnetically activated switches.

22. The rotation sensing device of claim 19, wherein the second magnetically activated switch is aligned with and positioned opposite the first magnetically activated switch.

23. The rotation sensing device of claim 19, wherein the second magnetically activated switch is positioned at an oblique angle to the first magnetically activated switch.

24. The rotation sensing device of claim 19, wherein the first and second magnetically activated switches are mounted on a printed circuit board, the device further comprising:
a logic circuit connected to the printed circuit board, the logic circuit configured to sense each time the first and second magnetically activated switches are closed by the magnet to count the number of rotations of the magnet about the rotation axis.

25. The rotation sensing device of claim 19, wherein the first ends of each of the first and second magnetically activated switches are approximately equal distances from a center point, the device further comprising:
a support member perpendicular to the printed circuit board and axially aligned with the center point supporting a radial member having the magnet fixed on an edge of the radial member.

26. The rotation sensing device of claim 19, wherein the first and second magnetically activated switches are each magnetic reed switches.

27. The rotation sensing device of claim 19, wherein the first and second magnetically activated switches are each Hall-effect switches.

28. The rotation sensing device of claim 19, wherein the first and second magnetically activated switches are each Weigand wire switches.

29. A rotation sensing device comprising:
at least one switch located in a first plane; and
a magnet rotating in a plane substantially perpendicular to the first plane about a rotation axis, wherein the magnet has a north-south axis tilted at an oblique angle to the first plane and wherein the magnet has a neutral portion intermediate north and south poles thereof, such that when the magnet is proximate the at least one switch, the north-south axis of the magnet points toward the at least one switch and such that when the magnet is distal the at least one switch, the neutral portion of the magnet is directed toward the at least one switch, and wherein the magnet causes the at least one switch to open and close as the magnet rotates about the rotation axis.

30. The rotation sensing device of claim 29, wherein:
the first end of the at least one switch is subjected to a maximum intensity of a magnetic field emitted from the magnet when the magnet is closest to the first end of the switch; and
the first end of the at least one switch is subjected to a minimum intensity of the magnetic field when the magnet is furthest from the switch as the magnet rotates about the rotation axis.

31. The rotation sensing device of claim 29, wherein:
a pole of the magnet is directed toward the first end of the at least one switch when the magnet is in a position closest to the first end; and
a side of the magnet is directed toward the first end of the at least one switch when the magnet is in a position other than the position closest to the first end.

32. A method for opening and closing a magnetically activated switch located in a first plane, the method comprising:
rotating a magnet in a second plane substantially parallel to the first plane, wherein the magnet has a north-south axis tilted at an oblique angle to the first plane and wherein the magnet has a neutral portion intermediate north and south poles thereof such that when the magnet rotates to a position closest to the switch a pole of the magnet is directed toward the switch causing the switch to close and when the magnet rotates to a position furthest from the switch the neutral portion of the magnet is directed toward the switch causing the switch to open.

33. The method of claim 32, wherein the switch is a magnetic reed switch.

34. The method of claim 32, wherein the switch is a Hall-effect switch.

35. The method of claim 32, wherein the switch is a Weigand wire switch.

36. The method of claim 32, wherein the magnet is tilted at an angle to the first plane of approximately 50 degrees.

37. A method for sensing rotations of a rotating device, the method comprising:
rotating a magnet in a first plane substantially parallel to a second plane containing at least one magnetic reed switch, the magnet rotating at a proportional speed to the rotating device and having a north-south axis tilted at an oblique angle to the second plane and wherein the magnet has a neutral portion intermediate north and south poles thereof, such that when the magnet is proximate the at least one magnetic reed switch, the north-south axis of the magnet points toward the at least one switch and such that when the magnet is distal the at least one switch, the neutral portion of the magnet is directed toward the at least one switch, wherein:
the magnet causes the switch to open and close as the magnet rotates;
the at least one switch is electrically connected to a logic circuit; and
the logic circuit is configured to sense the rotations of the rotating device based on the openings and closings of the at least one switch.

* * * * *